No. 12,371. REISSUED JULY 11, 1905.

C. B. WEBSTER.

LOOM SHUTTLE.

APPLICATION FILED JUNE 22, 1904.

Witnesses:

Horace A. Crossman.

Everett S. Emery.

Inventor:

Charles B. Webster.

by Emery Booth Powell

Att'ys

PHOTO-LITHOGRAPHED BY SACHETT & WILHELMS LITHO. & PTG. CO. NEW YORK

No. 12,371. Reissued July 11, 1905.

UNITED STATES PATENT OFFICE.

CHARLES B. WEBSTER, OF FALL RIVER, MASSACHUSETTS, ASSIGNOR OF ONE-HALF TO JAMES K. LANNING, OF BOSTON, MASSACHUSETTS.

LOOM-SHUTTLE.

SPECIFICATION forming part of Reissued Letters Patent No. 12,371, dated July 11, 1905.

Original No. 753,337, dated March 1, 1904. Application for reissue filed June 22, 1904. Serial No. 213,743.

*To all whom it may concern:*

Be it known that I, CHARLES B. WEBSTER, a citizen of the United States, residing at Fall River, in the county of Bristol and State of Massachusetts, have invented new and useful Improvements in Loom-Shuttles, of which the following is a specification.

This invention relates to shuttles for looms; and its object is to provide a self-threading shuttle of simple and cheap construction and which will not become accidentally unthreaded.

Figure 1:
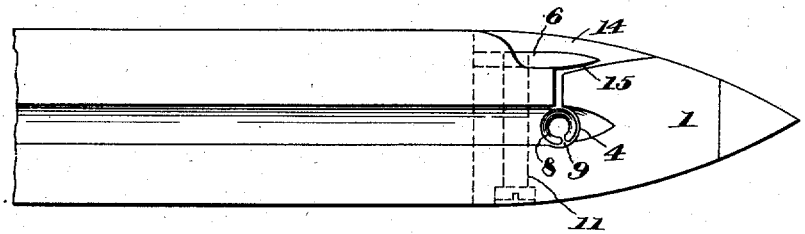
Figure 2:
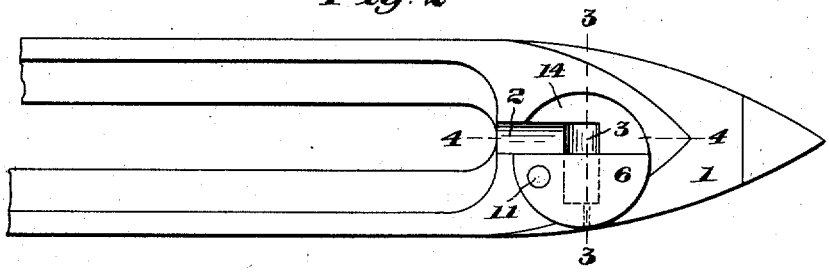
Figure 3:
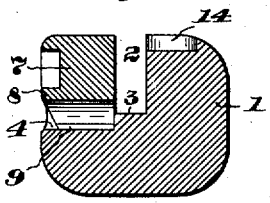
Figure 4:
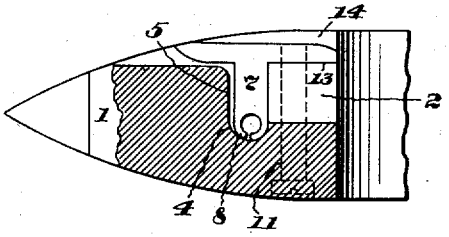
Figure 5:
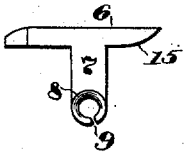
Figure 6:
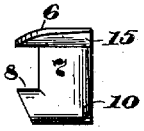

In the accompanying drawings, Figure 1 is a side elevation of one end of a shuttle containing my improvements. Fig. 2 is a top plan view of the same. Fig. 3 is a cross-section on the line 3 3, Fig. 2. Fig. 4 is a longitudinal section on the line 4 4, Fig. 2. Fig. 5 is a side elevation of the thread-guide. Fig. 6 is a front elevation of the same, and Fig. 7 is a bottom plan view thereof.

In the solid end portion of the shuttle 1 is cut a longitudinal slot or recess 2, extending down from the top of the shuttle to about its center. This slot opens at its rear end into the hollow body of the shuttle. At its front end is a lateral recess 3, somewhat deeper than the slot 2 and extending nearly to the outside of the shuttle. Near its lower end is a circular hole 4 in the side of the shuttle, and a narrow thread-entering slit 5 runs from the top of the shuttle down to the top of the hole 4.

Figure 7:
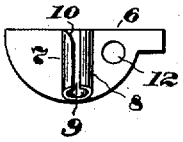

The thread-guide is shown separately in Figs. 5, 6, and 7. It is preferably cast in one piece and comprises a flat semicircular head 6, a shank 7 at right angles therewith, and a tubular eye portion 8 at the lower end of the shank, projecting toward the end of the outside of the shuttle and adapted to fit in the hole 4. The outer end of the eye portion is beveled downwardly, and a thread-inlet slit 9 runs along the bottom of the eye its entire length. At its inner end said eye portion is cut away in front of the slit, as indicated at 10, so that the guide not only presents a flat wall portion curving toward the slit, but the cut-away portion forms a curved heel over which the thread readily slips into the slit.

A screw 11 passes up through the solid part of the shuttle and into a tapped hole 12 in the head of the thread-guide, holding the head 6 firmly down on a shoulder 13, formed by a shallow recess 14 in the top of the shuttle. The front of the head 6 is chamfered off underneath at 15, so as to have a space between it and the top of the shuttle. Furthermore, the shank does not touch the front wall of the lateral recess 3 nor does the eye portion 8 touch the front and bottom of the hole 4.

To thread the shuttle, the thread is laid in the slot 2 and carried forward and under the front end of the head 6, then down through the thread-entering slit 5 into the hole 4, then up through the thread-inlet slit 9 into the tubular eye portion 8, this movement of the thread being facilitated by the cut-away portion 10. In this position the thread will not drop down through the slit 9 of its own accord, since it is held up in the inner end of the eye portion by the bottom of the slot 2, which stands above the bottom of the eye portion, as shown in Figs. 3 and 4.

The location of the thread-inlet passage or slit 9 below the bottom of the longitudinal slot 2 provides means which effectually prevents any tendency to unthread from the interior. When the thread is under slack tension, however, during operation of the shuttle, it tends to enter or work into any available exterior openings or passages adjacent the eye of guide and to start unthreading exteriorly or to jam and break through entanglement.

In the shuttle described the thread after entering the thread-guide is prevented from reentering the thread-inlet passage 9 and from any tendency initially to unthread by the beveling or recessing of the outer face of the thread-guide at the point where the said inlet-passage enters the same, thereby causing the shuttle-walls to project relatively beyond the mouth of the said passage. The normal draft of the thread leading through the thread-guide is thereby maintained at all times out of the mouth of the inlet-passage, for in periods of slack tension, where otherwise there would be a tendency for the thread to enter the passage-mouth and with the throw of the shuttle to unthread or jam and break, the relatively projecting shuttle-wall causes the thread-draft always to be above and out of the said passage-mouth.

It will be seen that the threading-passage consists of the thread-entering slit 5, the thread-inlet slit 9, and the connecting-passage which joins the said entering and inlet passages, said connecting-passage being formed on one side by the bore of the hole 4 and on the other by the outer wall of the tubular eye. The beveling or recessing of the outer face of the thread-guide permits the upper outer wall thereof, which is substantially flush with the outer shuttle face, to act as a thread-guard for the mouth of the passage or slit 5 where the latter joins the connecting-passage formed in the hole 4. This prevents possible jamming or unthreading, which might result from the entrance of the slack thread into the otherwise exposed mouth of the passage 5.

I claim—

1. The combination with a shuttle having a longitudinal slot and lateral recess, of a thread-guide in said recess having a tubular eye portion provided with a slit below the bottom of said slot.

2. The combination with a shuttle having a longitudinal slot, a lateral recess, a hole through the side of the shuttle near the bottom of said lateral recess and a slit extending from the top of the shuttle down to said hole, of a thread-guide in said lateral recess having a tubular slitted eye portion at its lower end entering said hole.

3. A thread-guide for a shuttle having a head, a shank perpendicular thereto, and a tubular eye portion transverse to said shank and provided with a slit in its bottom.

4. A thread-guide for a shuttle having a head 6 chamfered off underneath at 15, a shank 7 perpendicular to said head, and a tubular eye portion 8 transverse to said shank and provided with a slit 9 and a cut-away portion 10 at the inner end of said slit.

5. A hand-threading shuttle having a thread-guide in the delivery-opening thereof, said thread-guide being provided with a thread-inlet passage and an outer beveled face receding from the shuttle-face.

6. A hand-threading shuttle, having a thread-guide in the delivery-opening of the shuttle and provided with threading means, comprising an entering-passage leading through the body of the shuttle to a non-circular face of the thread-guide, an inlet-passage leading into said thread-guide and guarded from the entrance of the threaded filler-yarn, and a passage connecting the two passages, said latter passage being formed on one side by the body of the shuttle and on the other side, in whole or in part, by one of the non-circular walls of said thread-guide.

7. A hand-threading shuttle having a thread-guide in the delivery-eye thereof, a thread-inlet passage leading thereto and near the bottom thereof, means near the mouth of said guide for preventing the thread from entering the mouth of said inlet-passage, and means for maintaining the thread at the inner end of said guide toward the upper inner face thereof.

8. A hand-threading shuttle having a thread-guide in the delivery-eye thereof, a thread-inlet passage leading thereto, means near the mouth of said guide for preventing the thread from entering the mouth of said inlet-passage, and means for maintaining the thread near the inner end of said guide at or near the side of said thread-guide opposite to said inlet-passage.

9. A hand-threading shuttle having a lateral thread-guiding passage, a thread-guide in said passage, a thread-entering passage near the bottom of said guide, and a shuttle-wall portion for maintaining the thread out of the mouth of said thread-entering passage.

10. A thread-guide for a hand-threading shuttle having a thread-inlet passage and an outer face beveled toward said inlet-passage.

11. A thread-guide for a hand-threading shuttle having a thread-guiding passage and an entering-passage, said guide having a flat outer wall portion curved to and toward said entering-passage.

12. A thread-guide for a hand-threading shuttle having a thread-guiding passage, an entering-passage for said guide and a curved heel at the inner end of said guide for guiding the thread into the thread-entering passage.

In testimony whereof I have signed my name to this specification in the presence of two subscribing witnesses.

CHARLES B. WEBSTER.

Witnesses:
MILTON DRUCE,
S. W. ASHTON.